UNITED STATES PATENT OFFICE.

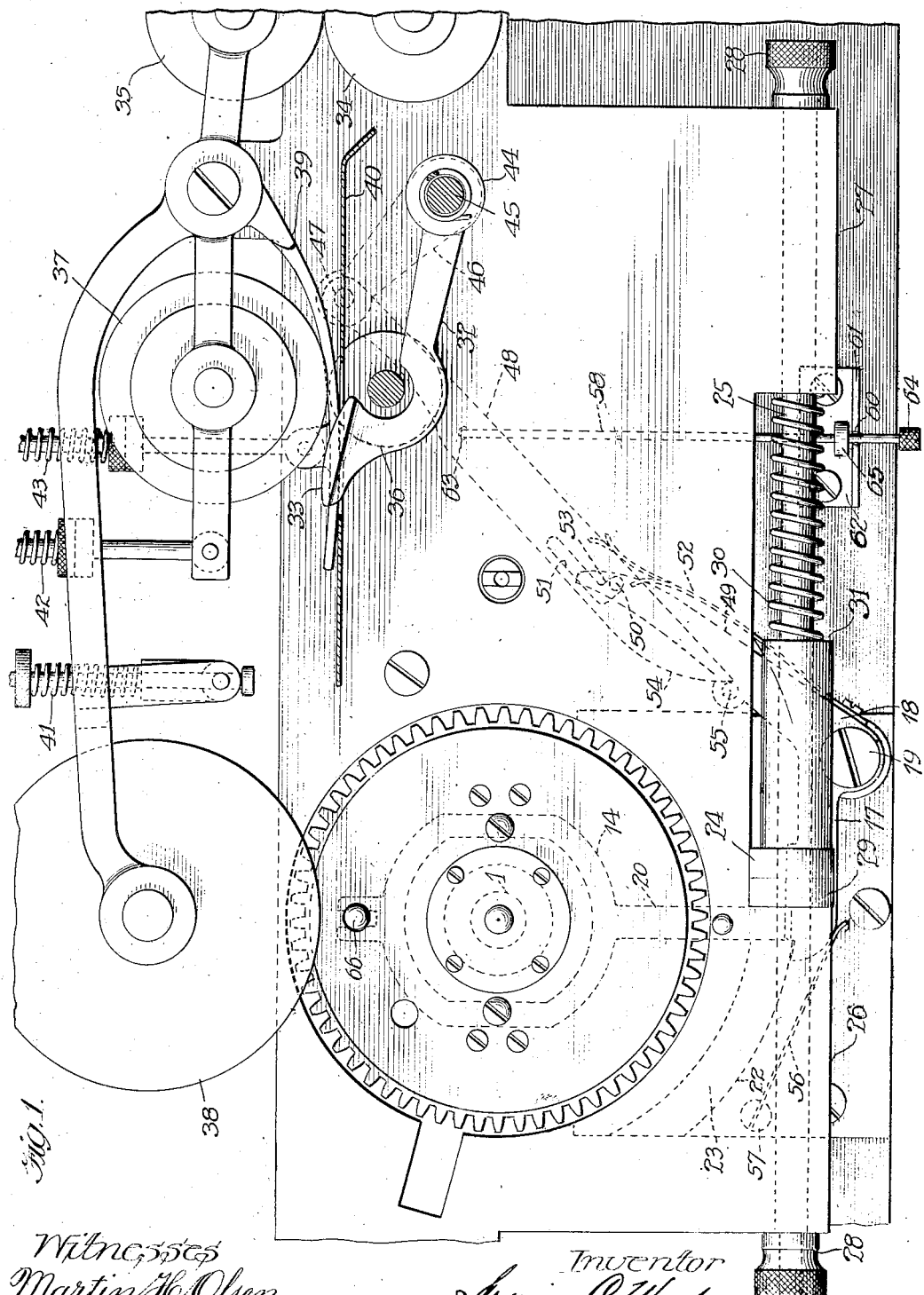

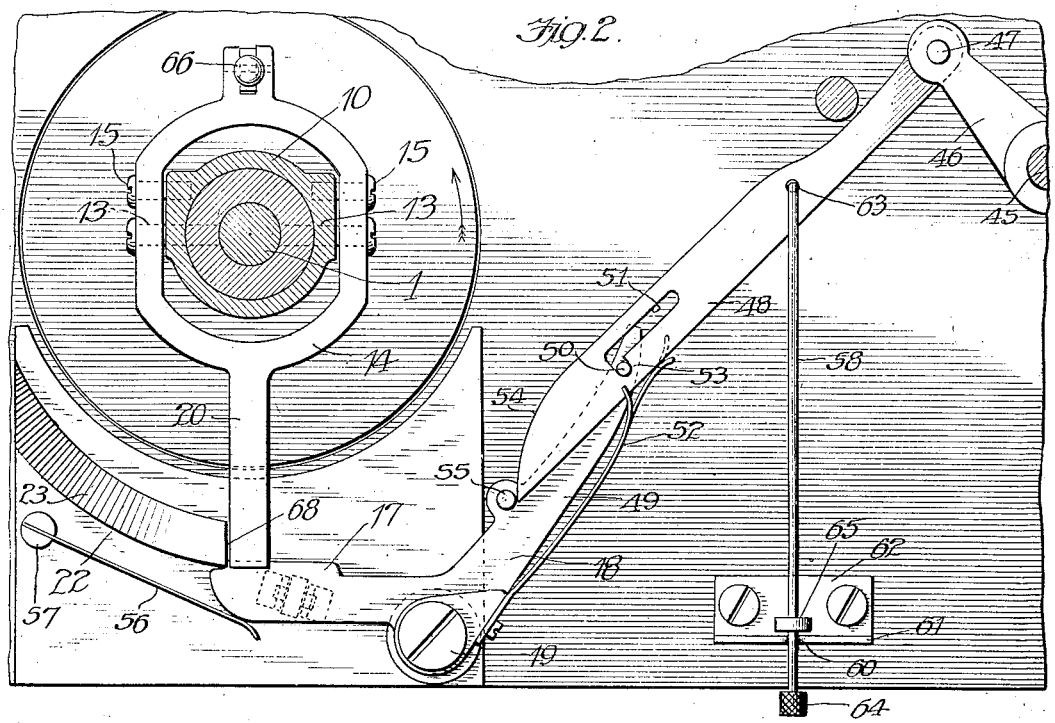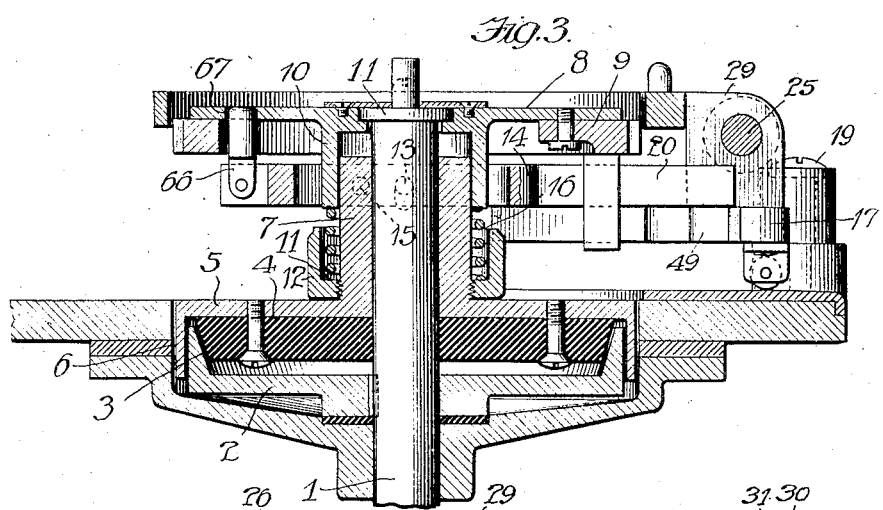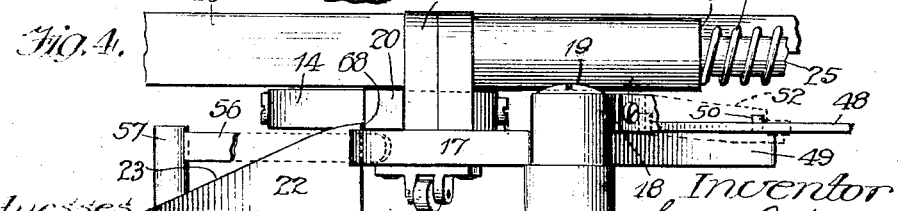

IRVING C. WOODWARD, OF CHICAGO, ILLINOIS, ASSIGNOR TO AMERICAN POSTAGE METER CO., A CORPORATION OF ARIZONA.

STOP MECHANISM.

1,190,616.  Specification of Letters Patent.  Patented July 11, 1916.

Application filed December 1, 1913. Serial No. 804,101.

*To all whom it may concern:*

Be it known that I, IRVING C. WOODWARD, a citizen of the United States of America, and a resident of Chicago, county of Cook, and State of Illinois, have invented certain new and useful Improvements in Stop Mechanisms, of which the following is a specification.

The main objects of this invention are to provide a clutch controlling mechanism suitable for intermittently operated machines, such as mail marking machines, and adapted to be tripped or set in operation by the application of a slight force such as may be obtained from the edge of a card or envelop passing through the machine.

Further objects of the invention are to provide an arrangement of the clutch controlling devices and a stop for the clutch not requiring movement of the stop to release the clutch therefrom.

An illustrative embodiment of this invention is shown in the accompanying drawings, in which—

Figure 1 is a plan view of the clutch mechanism. Fig. 2 is another plan view with some of the parts omitted. Fig. 3 shows a clutch and part of its controlling mechanism in vertical section. Fig. 4 is a front elevation of part of the clutch controlling mechanism.

The general arrangement shown in the drawings includes paper or envelop feeding rollers, a trip adapted to be operated by material fed through the machine, a clutch and controlling mechanism between said clutch and trip adapted to permit the two coacting members of the clutch to move into engagement upon operation of the trip. Such parts of the machine as are driven through the clutch are omitted from the drawings, but an example of a machine to which the present clutch mechanism may be applied is shown and described in the patent to Arthur H. Pitney, No. 753,207, mail marking machines.

Referring to the drawings, a drive shaft 1 carries rigidly a clutch member 2 provided with an internal conical face 3 for coöperating with a conical clutch member 4 secured to a disk 5, having an annular flange 6 surrounding the member 2, and a boss 7 surrounding the shaft 1. Mounted on the boss 7 is a disk 8 to which is secured a gear 9. The gear 9 is normally held against rotation but is adapted to transmit power from shaft 1 to driven elements of the machine, when clutch member 4 is permitted to engage the clutch member 2. A compression spring 16 is interposed between the ends of a sleeve 10 of plate 8 and the inner face 11 of a nut 12 having threaded engagement with the boss 7.

The boss 7 carries a pair of pins or screws 13 on which is pivoted a clutch operating lever 14. Lever 14 is also pivoted by screws 15 to sleeve 10. The latter is prevented from moving longitudinally on shaft 1 by a collar 1.1 fast on the shaft and coacting with shoulders on the gear. Therefore when the arm 14 is rocked on its pivots 15 the clutch member 4 through the boss 7 may be raised out of engagement with the clutch member 2 or lowered into engagement. The action of spring 16 is to normally urge the clutch member 4 into engagement with clutch member 2 but it is normally prevented from such movement by movable means in the form of an arm 17 of a bell crank lever 18 pivoted to the machine frame by a screw 19. Arm 20 of lever 14 normally rests on arm 17 as shown in Fig. 2, but by rocking bell crank to the left Fig. 2 lever 14 is released and the clutch member 4 engaged with clutch member 2. Shaft 1 is continuously rotated in the direction indicated by the arrow Fig. 2 and when lever 14 is released, this lever, together with clutch member 4, disk 8 and gear 9 are also rotated in the direction indicated by the arrow.

Mounted on the base 21 is a block 22 having a surface 23 inclined with respect to the direction of rotation of arm 20. When arm 20 nears the completion of a single rotation it engages the incline 23 and by this means is rocked upwardly on its pivots 15 and through screws 13 raising boss 7, withdrawing clutch member 4 from engagement with clutch member 2. Arm 20 is stopped in its normal position by a leather padded buffer 24 slidably mounted on a rod 25 secured in the bearings 26 and 27 in the frame of the machine by the thumb nuts 28. Buffer 24 is provided with a leather facing 29 for engagement with arm 20 and is cushioned by a coiled spring 30 surrounding the rod 25 and compressed between the rear face 31 of the plunger 24 and the bearing 27.

A bell crank lever 18 is operated to release the clutch by means of a trip finger 32 having a curved face 33 extending into the path of movement of articles fed through the machine, by driven feed rollers 34, 35, 36, 37 and 38. To accommodate articles of different thicknesses, rollers 38 and 37, together with a guide member 39, are arranged to be moved against the action of springs 41, 42 and 43 away from the fixed guide wall 40 by articles in transit. Finger 32 is carried by a shaft 45. This shaft also carries an arm 46 to the outer end of which is pivoted by a pin 47 a link 48 connecting said arm with the arm 49 of bell crank lever 18. A pin 50 carried by arm 49 passes through an L-shaped slot 51 in link 48. A leaf spring 52 carried by bell crank lever 18 normally holds link 48 in such position that the offset part 53 of L-shaped slot 51 engages pin 50. The outer end of link 48 is curved as indicated at 54 for the purpose of having a camming engagement with a pin 55 carried by bell crank lever 18. By this construction when trip finger 32 is engaged by an envelop or other article passing through the machine, it is rocked to the right and carries with it through sleeve 44 the arm 46 and link 48. The link, in its movement, engages a pin 50 at the offset in slot 51 and also engages pin 55 at its curved end 54. By engagement with pin 50 the bell crank lever 18 is caused to rock to the left, carrying its arm 17 out of engagement with arm 20 of lever 14. The spring 16 then operates to force the two members of the clutch into engagement. The action of the curved end 54 of link 48 on pin 55 is to cam the link out of engagement with pin 50 so that further movement of the link will result in pin 50 passing freely into the elongated part of slot 51. With the pin 50 in this position bell crank lever 18 is free to return immediately to its normal position, regardless of the position of finger 32, and with arm 17 in position to hold the clutch operating lever 14 in its upper position when it engages the buffer 29 after having ridden up the incline 23. A spring 56 carried by a fixed post 57 and engaging the outer end of arm 17 as shown in Fig. 2, serves to return the bell crank lever 18 to normal position when released from the offset 53 in the slot in link 48.

The trip finger 32 may be made entirely inoperative by rocking link 48 on its pivot 47 and maintaining it in its moved position so that the elongated part of the L-shaped slot 51 is in alinement with pin 53. When in this position longitudinal movement of link 48, due to operation of trip finger 32, does not affect the position of the bell crank lever 18, since pin 50 remains in the longitudinal part of slot 51 and remains stationary as link 48 idly slides back and forth. The link may be moved to inoperative position by a rod 58 seated in a notch 60 in the upright flange 61 of a fixed bracket 62. The rear end of rod 58 is bent downwardly to pass through a hole 63 in link 48 and at its forward end is provided with a knurled head 64 and slightly inward from the knurled head a fixed collar 65. Thus by raising rod 58 and moving it lengthwise so that it comes to rest at notch 60 with the collar 65 at one side or the other of flange 61, link 48 is retained in either its operative or inoperative position.

In the drawings, lever 14 is shown having pivoted thereto at its rear end a small plunger 66 adapted to move slightly upward in a hole 67 in disk 8 when the lever 14 rocks in the direction for engaging clutch member 4 with clutch member 2. Applicant's copending application No. 804,103, postage meters, filed December 1, 1913, discloses mechanism whereby operation of clutch engaging lever 14 is prevented by causing an obstruction to move in position above plunger 67. The clutch may thereby be disabled automatically and locked against further operation by said obstruction not herein shown.

In the operation of the device, an envelop or card, on being fed through the machine by feed rollers 34, 35, 36 and 37, engages the curved surface 33 of trip 32, rocking the trip in a left hand direction and through shaft 45 rocking arm 46 in a similar direction. By this means the link 48 is caused to engage pin 50 on bell crank lever 18 in the recess 53 in slot 51. The bell crank lever, due to this engagement, rocks in a left hand direction, carrying its arm 17 from beneath arm 20 on lever 14. The latter is then swung downwardly around its pivots 15 by the action of coiled spring 16 between sleeve 10 of disk 8 and the nut 12 secured to the movable member 4 of the clutch. The gear 9 is by this means connected in driving relation with the driven shaft 1. After the release of the clutch operating lever 14, the bell crank 18 immediately returns to its normal position under the action of spring 56. Pin 50 on the bell crank lever is at this time in the elongated part of slot 51 in link 48, due to the link having been cammed toward the right through engagement at its end with pin 55 during the forward movement of the link. Finger 33 may return at any time depending upon the length of the article passing the finger. The connection between the link and bell crank lever 18 prevents the bell crank lever from again being moved to the clutch-releasing position until after it has returned to its normal position. Driven member 4 carries with it in its rotation the clutch operating lever 14 and the driving gear 9 with which it is connected. Near the completion of each revolution arm 20 rides upward on the stationary incline 23 causing the operating lever 14 to lift clutch member 4 out of engagement with member 2. The momentum of the clutch member 4 and the parts driven thereby is overcome by the buffer 29, which brings the lever 14 to rest with its arm 20 supported by the trip arm 17.

The parts are now in their normal position of rest ready to be set into operation by the movement of the arm 17 as hereinbefore described. It is to be noted that the incline 23 extends above the upper surface of the arm 17 so that its end 68 provides a recoil shoulder adapted to prevent rebounding of the arm 20 after striking the buffer 29, as will be understood from Fig. 4. In the normal operation of the machine the weight and speed of rotation of the parts connected with the upper clutch member are such that the arm 20 will always be carried over the stationary incline 23 and strike the buffer 29. The incline 23 being stationary and being in no way affected by the blow which it receives from the arm 20, positively insures the disengagement of the clutch members whenever the arm 20 approaches the position in which it is shown in Fig. 2, and since its motion on coming in contact with the trip arm 17 is purely a vertical one, being the downward movement of the arm 20 under the action of the spring 16 after said arm is brought to rest by the buffer 29, it is impossible for the arm 20 to accidentally cause the retraction of the arm 17, and thereby permit of more than one revolution of the printing drum per envelop.

Under normal operating conditions the collar 65 on the rod 58 is located behind the flange 61, as shown in Fig. 1, but if for any reason it is desired to operate the feeding mechanism without operating the printing drum the trip mechanism may be rendered inoperative by lifting the arm 58 and pulling it forward so that the shoulder 65 is in front of the flange 61. This, as has been already described, shifts the link 48 toward the right so that the longitudinal branch of the slot 51 is brought into line with the pin 50. Then if an envelop retracts the finger 32, the link 48 merely slides back and forth on the pin 50 without applying any force thereto.

Although but one specific embodiment of this invention has been herein shown and described, it will be understood that numerous details of the construction shown may be altered or omitted without departing from the spirit of this invention as defined by the following claims.

I claim:—

1. In a device of the class described, the combination of a rotating driving member, a driven member, said driven member having movement axially of said driving member for the purpose of being engaged or disengaged therewith, a spring for normally urging said driven member into engagement with the driving member, movable means for normally preventing the operation of said spring, and a cam separate from said means adapted to disengage said driven member from the driving member, said means being adapted to support the driven member against the action of said spring in the position in which said driven member is placed by the action of said cam.

2. In a device of the class described, the combination of a rotating driving member, a driven member, said driven member having movement axially of said driving member for the purpose of being engaged or disengaged therewith, a spring for normally urging said driven member into engagement with the driving member, movable means for normally preventing the operation of said spring, a cam adapted to disengage said driven member from the driving member, said means being adapted to support the driven member against the action of said spring in the position in which said driven member is placed by the action of said cam, and a stationary buffer for stopping said driven member in normal position.

3. In a device of the class described, the combination of a rotating driving member, a driven member, said driven member having movement axially of said driving member for the purpose of being engaged or disengaged therewith, a spring for normally urging said driven member into engagement with the driving member, movable means for normally preventing the operation of said spring, a cam adapted to disengage said driven member from the driving member, said means being adapted to support the driven member against the action of said spring in the position in which said driven member is placed by the action of said cam, and a spring cushioned buffer for stopping said driven member in normal position.

4. In a device of the class described, the combination of a rotating driving member, a driven member, said driven member having movement axially of said driving member for the purpose of being engaged or disengaged therewith, a spring for normally urging said driven member into engagement with the driving member, movable means for normally preventing the operation of said spring, a cam adapted to disengage said driven member from the driving member, said means being adapted to support the driven member against the action of said spring in the position in which said driven member is placed by the action of said cam, a spring cushioned buffer for stopping said driven member in normal position, and a fixed shoulder opposed to said buffer and adapted to prevent recoil of said driven member.

5. In a device of the class described, the combination of a rotating driving member, a driven member, said driven member having movement axially of said driving member for the purpose of being engaged or disengaged therewith, a spring for normally urging said driven member into engagement with the driving member, movable means for normally preventing the operation of said spring, and a fixed incline in position to cam said driven member to its disengaged position, said means being adapted to support the driven member against the action of said spring in the position in which said driven member is placed by the action of said incline.

6. In a device of the class described, the combination of a rotating driving member, a driven member, said driven member having movement axially of said driving member for the purpose of being engaged or disengaged therewith, a spring for normally urging said driven member into engagement with the driving member, movable means for normally preventing the operation of said spring, a fixed incline in position to cam said driven member to its disengaged position, said means being adapted to support the driven member against the action of said spring in the position in which said driven member is placed by the action of said incline, and a stationary buffer for stopping said driven member in normal position.

7. In a device of the class described, the combination of the driving and driven members of a clutch, a pivoted controlling arm for the clutch normally in engagement therewith, a pin on said arm, a link having an offset slot for receiving said pin, means for reciprocating said link pivoted thereto, a second pin on said arm adapted to cam said link out of engagement with said first mentioned pin after the arm has been rocked out of engagement with the clutch, and a spring for urging said link into engagement with said first mentioned pin.

8. In a device of the class described, the combination of the driving and driven members of a clutch, a pivoted controlling arm for the clutch normally in engagement therewith, a pin on said arm, a link having an offset slot for receiving said pin, means for reciprocating said link pivoted thereto, a second pin on said arm adapted to cam said link out of engagement with said first mentioned pin after the arm has been rocked out of engagement with the clutch, a spring for urging said link into engagement with said first mentioned pin, and means for permanently retaining said clutch controlling arm in disengaged position.

9. In a device of the class described, the combination of a rotating driving member, a driven member, said members having a relative movement for the purpose of being engaged or disengaged, means normally urging said members into engagement with each other, movable means controlling said urging means, and a stationary cam separate from said movable means and in position to disengage said members.

10. In a device of the class described, the combination of a rotating driving member, a driven member, said members having a relative movement for the purpose of being engaged or disengaged, means normally urging said members into engagement with each other, operating means for controlling said urging means, movable means for normally preventing the operation of said operating means, and a stationary cam separate from said movable means and in position to coact with said operating means for disengaging said members.

Signed at Chicago this 20th day of November, 1913.

IRVING C. WOODWARD.

Witnesses:
 EUGENE A. RUMMLER,
 M. IRENE HUTCHINGS.